US012793362B2

(12) United States Patent
Ogi et al.

(10) Patent No.: US 12,793,362 B2
(45) Date of Patent: Nov. 10, 2026

(54) CONTROL APPARATUS AND INFORMATION PRESENTATION METHOD

(71) Applicant: Hitachi, Ltd., Tokyo (JP)

(72) Inventors: Yuya Ogi, Tokyo (JP); Toshiteru Nakamura, Tokyo (JP); Takashi Numata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 18/882,688

(22) Filed: Sep. 11, 2024

(65) Prior Publication Data

US 2025/0139914 A1 May 1, 2025

(30) Foreign Application Priority Data

Oct. 30, 2023 (JP) ................................ 2023-185597

(51) Int. Cl.
*G06T 13/40* (2011.01)
*G06F 3/01* (2006.01)
(Continued)

(52) U.S. Cl.
CPC ............ *G06T 19/006* (2013.01); *G06F 3/011* (2013.01); *G06Q 10/06398* (2013.01); *G06T 13/40* (2013.01)

(58) Field of Classification Search
CPC ....... G06T 19/006; G06T 13/40; G06F 3/011; G06F 3/017; G06F 3/04815; G06F 3/005; G06F 3/0484; G06Q 10/06398
See application file for complete search history.

(56) References Cited

U.S. PATENT DOCUMENTS

2015/0099252 A1* 4/2015 Anderson ............... G06T 7/251 434/257
2020/0312173 A1 10/2020 Moriguchi et al.
(Continued)

FOREIGN PATENT DOCUMENTS

CN 113971903 A 1/2022
CN 114581632 A 6/2022
(Continued)

OTHER PUBLICATIONS

Clarke et al.—"Reactive Video: Adaptive Video Playback Based on User Motion for Supporting Physical Activity", 2020. Available at: [https://eprints.lancs.ac.uk/id/eprint/147601/1/ReactiveVideo_UIST2020_PrePrint.pdf] (Year: 2020).*
(Continued)

*Primary Examiner* — Daniel F Hajnik
*Assistant Examiner* — Adeel Bash
(74) *Attorney, Agent, or Firm* — MATTINGLY & MALUR, PC

(57) ABSTRACT

A control apparatus presents a three-dimensional operation to a worker using cross reality. The control apparatus is configured with a computer including a calculation device that performs a predetermined calculation process and a storage device that the calculation device is able to access. The calculation device includes an acquisition unit that acquires work information of work performed by the worker. The calculation device includes a calculation unit that performs calculation to present consecutive instruction content corresponding to the work performed by the worker to the worker. The calculation device includes an output unit that outputs content. The calculation unit includes a control unit that dynamically controls a display method for the consecutive instruction content according to a spatial diver-
(Continued)

gence between the work information acquired by the acquisition unit and the consecutive instruction content.

12 Claims, 11 Drawing Sheets

(51) Int. Cl.

| | |
|---|---|
| ***G06Q 10/0639*** | (2023.01) |
| ***G06T 19/00*** | (2011.01) |

(56) References Cited

U.S. PATENT DOCUMENTS

| | | | |
|---|---|---|---|
| 2022/0051579 | A1 | 2/2022 | Fujiwara et al. |
| 2022/0365351 | A1 | 11/2022 | Woods et al. |

FOREIGN PATENT DOCUMENTS

| | | | |
|---|---|---|---|
| JP | 2020-3707 | A | 1/2020 |
| JP | 2023-016589 | A | 2/2023 |
| TW | 202247109 | A | 12/2022 |

OTHER PUBLICATIONS

Ikeda et al.—"AR based Self-sports Learning System using Decayed Dynamic Time Warping Algorithm", 2018. Available at: [https://diglib.eg.org/bitstream/handle/10.2312/egve20181330/171-174.pdf] (Year: 2018).*

Celebi et al.—"Gesture Recognition using Skeleton Data with Weighted Dynamic Time Warping", 2013. Available at: [https://www.scitepress.org/PublishedPapers/2013/42176/42176.pdf] (Year: 2013).*

Korean Office Action received in corresponding Korean Application No. 10-2024-0134683 dated Dec. 15, 2025.

* cited by examiner

CONTROL APPARATUS AND INFORMATION PRESENTATION METHOD

CROSS-REFERENCE TO RELATED APPLICATION

The present application claims priority from Japanese patent application JP 2023-185597 filed on Oct. 30, 2023, the content of which is hereby incorporated by reference into this application.

BACKGROUND OF THE INVENTION

1. Field of the Invention

The present invention relates to a control apparatus that presents information to a worker.

2. Description of Related Art

As a method of giving instructions for work content to workers in sites, manuals made of paper media or manuals displayed on tablet terminals have been widely used in the related art. In recent years, there have been efforts to give instructions for work content by confirming work procedure images overlaid on real spaces using head-mounted displays and cross reality (XR) techniques.

As a system that gives an instruction for work content using an augmented reality space, there is the following techniques of the related art. JP2023-16589A discloses a camera that images a side in front of the face of an inspector, an inspector display apparatus that displays an image, a display apparatus that displays an image, and an inspection work support system that generates an order sign image indicating an order of inspection work based on inspection work procedure information extracted by a database access unit and generates a display order sign image by changing a position of the order sign image so that the position of the order sign image is attached to an inspection target work location in a current time-point image identified by the inspection target work location identification unit.

In such a work system, there is an instance where a worker may miss content for giving a work instruction. The missing of the content can incur since content is displayed outside of a field of view of an MR device and since a field of view is moved to a position distant from the content when the worker performs work different from the content. When the content is moved dynamically, the worker may not be able to follow a movement speed of the content. Then, it is necessary to provide assistance for returning the content back into the field of view.

The inspection work support system disclosed in JP2023-16589A stops displaying of the display order sign image when it is detected that a viewpoint of the eyes of an inspector deviates beyond a predetermined distance from an inspection target work location. However, there is a problem that the inspection target work location is not specified for the inspector and the inspection target work location is lost. Because three-dimensional content is not handled, there is a problem that it is difficult to give a work instruction for a complicated shape or operation.

SUMMARY OF THE INVENTION

An object of the present invention is to improve work efficiency of a worker by acquiring work information of the worker, detecting a divergence from a model operation or state, and dynamically controlling reproduction of content.

A representative example of the invention disclosed in the present specification is as follows. That is, a control apparatus presents a three-dimensional operation to a worker using cross reality. The control apparatus is configured with a computer including a calculation device that performs a predetermined calculation process and a storage device that the calculation device is able to access. The calculation device includes an acquisition unit that acquires work information of work performed by the worker. The calculation device includes a calculation unit that performs calculation to present consecutive instruction content corresponding to the work performed by the worker to the worker. The calculation device includes t unit that outputs content. The calculation unit includes a control unit that dynamically controls a display method for the consecutive instruction content according to a spatial divergence between the work information acquired by the acquisition unit and the consecutive instruction content.

According to an aspect of the present invention, it is possible to improve work efficiency of a worker by acquiring work information of the worker, detecting a divergence from an ideal operation or state, and dynamically controlling reproduction of content. The above-described problems, configurations, and advantages will be apparent from description of the following embodiments.

DESCRIPTION OF EMBODIMENTS

Embodiment 1

Figure 1:
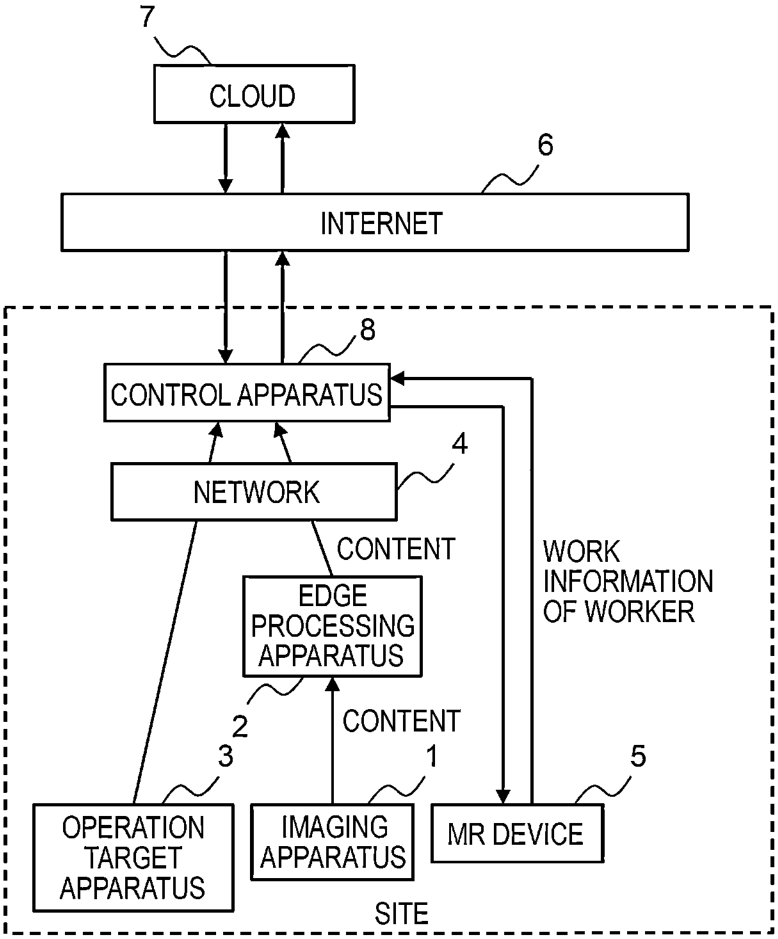
FIG. 1 is a diagram illustrating a configuration of a work support system according to Embodiment 1.

FIG. 1 is a diagram illustrating a configuration of a work support system according to Embodiment 1.

The work support system to the present embodiment includes an imaging apparatus 1, an edge processing apparatus 2 connected to the imaging apparatus 1, a control apparatus 8 processing an observation result by the imaging apparatus 1, a network 4 connecting the edge processing apparatus 2 to the control apparatus 8, and an MR device 5. A manipulation target apparatus 3 manipulated by a wearer of the MR device 5 may be connected to the control apparatus 8 via the network 4. The work support system may include a manager terminal. The work support system may be connected to a cloud 7 via an external Internet 6. A work log, a work analysis result, and the like acquired by the control apparatus 8 are stored in the control apparatus 8 or the cloud 7.

The imaging apparatus 1 is a sensor that observes a situation of a site. The imaging apparatus 1 may be an apparatus capable of acquiring three-dimensional point group data. For example, a TOF camera that outputs an image with a distance in which a distance D of each pixel is attached to RGB data can be used. The imaging apparatus 1 may be a stereo camera that includes two complementary metal oxide semiconductor (CMOS) image sensors, a structured light type sensor in which a projection pattern light-emitting element and an image sensor are combined, a sensor device in which a distance sensor and a simple RGB camera are combined to adjust a relation between pixels, or the like. A sensor that has a function of estimating distance information of each pixel from an RGB image using machine learning or the like may be used. The plurality of imaging apparatuses 1 may be provided to cover a large range of a site including a work range of a worker and may be installed so that an observation range of each imaging apparatus 1 overlaps each other. The imaging apparatus 1 observes a static object of which a shape or a position does not change, such as a facility installed in a site or a structure of a room, or a dynamic object of which a shape or position changes, such as a vehicle, a construction machine, a robot, a worker, a tool, or a work target. The imaging apparatus 1 may be a camera that captures an image of a worker capable of performing a motion capture process with the control apparatus 8.

The edge processing apparatus 2 is a computer that generates 3D sensing data including a plurality of pieces of three-dimensional data or a human skeleton model from the point group data acquired by the imaging apparatus 1. By causing the edge processing apparatus 2 to generate the 3D sensing data from the point group data, it is possible to reduce a communication amount between the edge processing apparatus 2 and the control apparatus 8 and inhibit strain of the network 4. When there is no problem in a bandwidth of the network 4, three-dimensional information may be generated after the point group data is transmitted to the control apparatus 8 as it is.

The control apparatus 8 receives work information of a worker from the MR device 5, detects the work information of the worker based on the three-dimensional information collected from one or more edge processing apparatuses 2, or acquires the work information of the worker using both methods. The control apparatus 8 may estimate a motion of the worker through the motion capture process using an image acquired by the imaging apparatus 1. The control apparatus 8 transmits consecutive instruction content to be presented to the worker to the MR device 5. The worker can correctly understand work content and perform the work content in a correct procedure by imitating operations of the consecutive instruction content displayed on the MR device 5. The consecutive instruction content is a three-dimensional moving image including three-dimensional operations of an avatar (for example, a model person) in a virtual space, and is overlaid with a video of the worker in the real space using a cross reality technique to be displayed on the MR device 5. The work involves an action of a person performing a certain operation, for example, an action such as assembly of an apparatus, manipulation of an apparatus, or gripping of an object.

The control apparatus 8 may generate a three-dimensional virtual space from three-dimensional information collected from the edge processing apparatuses 2.

The network 4 is a wireless network that connects the edge processing apparatuses 2 to the control apparatus 8 and is appropriate for data communication. For example, a high-speed and low-latency 5G network can be used. When the edge processing apparatus 2 is installed fixedly, a wired network may be used as the network 4.

The MR device 5 is a device worn by a worker manipulating the manipulation target apparatus 3 on a site, and includes a processor that executes a program, a memory that stores a program or data, a network interface that communicates with the control apparatus 8, and a display that displays an image transmitted from the control apparatus 8. The display may be a transmission type display, and a wearer may view a video transmitted from the control apparatus 8 and overlaid with the periphery through the display. The MR device 5 may include a camera that images a side in front of the wearer and transmit a video captured by the camera to the control apparatus 8. The MR device 5 may display a video captured by the camera imaging the side in front of the wearer and overlaid with the video transmitted from the control apparatus 8. The MR device 5 may include a sensor that detects positional coordinates and an attitude of the head of the wearer and may transmit positional information and the attitude (for example, a direction in which the face is oriented) of the head detected by the sensor to the control apparatus 8. The MR device 5 may include a sensor that detects hand skeleton information of the wearer and may transmit the hand skeleton information of the wearer detected by the sensor to the control apparatus 8. The MR device 5 may include a camera that images the eyes of the wearer and may detect a visual line direction of the wearer from a video captured by the camera. The MR device 5 may include a microphone that detects a sound heard by the wearer.

The worker may wear a wearable sensor (for example, a tactile globe). The tactile globe detects a tactile sensation and transmits the tactile sensation to the control apparatus 8. The wearable sensor may detect motions of the fingers of the worker, and the control apparatus 8 may generate a skeleton model of the worker from the motions of the fingers detected by the wearable sensor and detect work information of the worker.

Access from the MR device 5 to the control apparatus 8 may be authenticated with an ID and a password or may be authenticated with a unique address (for example, a MAC address) of the apparatus, so that security of the work support system can be guaranteed.

Figure 2:
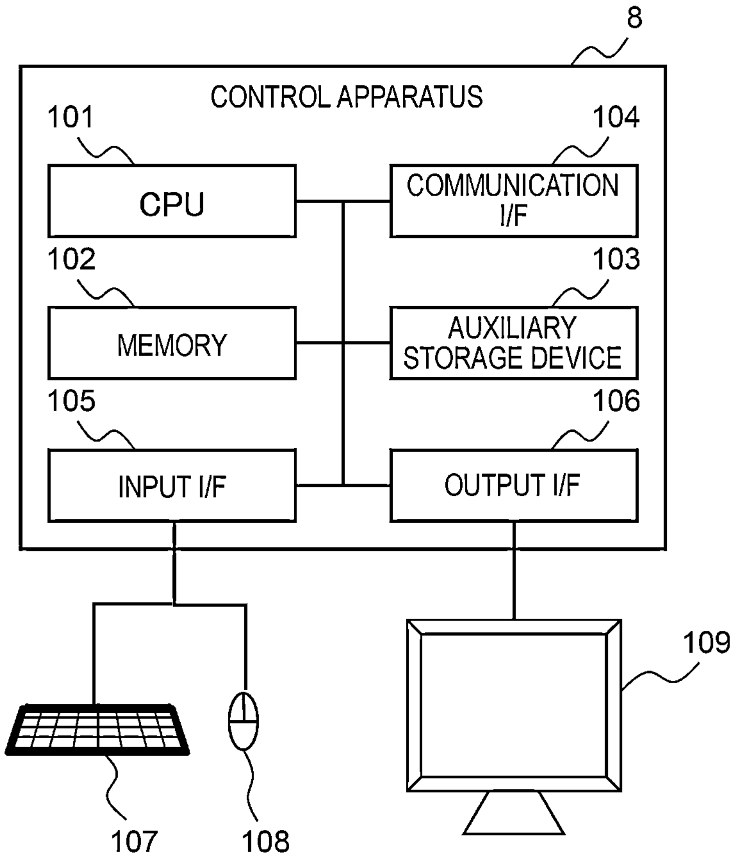
FIG. 2 is a block diagram illustrating a physical configuration of a computer provided in the work support system according to Embodiment 1.

FIG. 2 is a block diagram illustrating a physical configuration of a computer provided in the works support system according to Embodiment 1. In FIG. 2, the control apparatus 8 is illustrated as an example of the computer and the edge processing apparatus 2 may have the same configuration.

The control apparatus 8 of the present embodiment is configured with a computer that includes a processor (CPU) 101, a memory 102, an auxiliary storage device 103, and a communication interface 104. The control apparatus 8 may include an input interface 105 and an output interface 106.

The processor 101 is a calculation device that executes a program stored in the memory 102. When the processor 101 executes various programs, each functional unit (for example, a work information acquisition unit 10, a control unit 12, an output unit 13, a communication unit 15, and the like) of the control apparatus 8 is implemented. Some of processes performed by the processor 101 executing the programs may be performed by other calculation devices (for example, hardware such as a GPU, an ASIC, and an FPGA).

The memory 102 includes a ROM that is a nonvolatile storage element and a RAM that is a volatile storage element. The ROM stores an invariable program (for example, BIOS) or the like. The RAM is a high-speed volatile storage element such as a dynamic random access memory (DRAM) and temporarily stores a program executed by the processor 101 and data used during execution of the program.

The auxiliary storage device 103 is, for example, a large-capacity nonvolatile storage device such as a magnetic storage device (HDD) or a flash memory (SSD). The auxiliary storage device 103 stores a program executed by the processor 101 and data used for the processor 101 to execute the program. That is, the program is read from the auxiliary storage device 103, loaded to the memory 102, and executed by the processor 101 to implement each function of the control apparatus 8.

The communication interface 104 is a network interface device that controls communication with another apparatus (for example, the edge processing apparatus 2 or the cloud 7) in conformity with a predetermined protocol.

The input interface 105 is an interface to which an input device such as a keyboard 107 or a mouse 108 is connected and that accepts an input from an operator. The output interface 106 is an interface to which an output apparatus such as the display apparatus 109 or a printer (not illustrated) is connected and that outputs an execution result of a program in a format that can be viewed by the worker.

A program executed by the processor 101 is provided to the control apparatus 8 via a removable medium (a CD-ROM, a flash memory, or the like) or a network and is stored in a nonvolatile auxiliary storage device 103 that is a non-transitory storage medium. Therefore, the control apparatus 8 may include an interface that reads data from a removable medium.

The control apparatus 8 may be configured on a single physical computer or a computer system including a plurality of logical or physical computers, and may operate on a virtual computer constructed on a plurality of physical computer resources. For example, each functional unit may operate on an individual physical or logical computer or a plurality of functional units may be combined and operated on one physical or logical computer.

Figure 3:
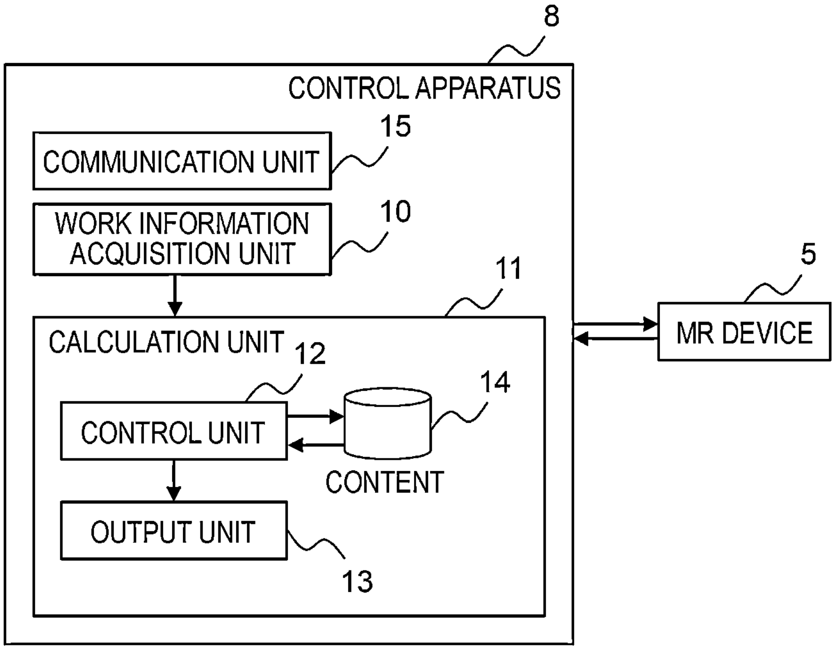
FIG. 3 is a logical block diagram illustrating a control apparatus according to Embodiment 1.

FIG. 3 is a logical block diagram illustrating the control apparatus 8 according to Embodiment 1.

The control apparatus s 8 includes the work information acquisition unit 10, a calculation unit 11, and the communication unit 15. The calculation unit 11 includes the control unit 12, the output unit 13, and a content database 14.

The work information acquisition unit 10 acquires work information of a worker from the imaging apparatus 1 or the MR device 5. The work information is, for example, information regarding an operation of the worker, such as a motion of fingers, a position of a hand, a position or an attitude of a head, a visual line, or the like.

The control unit 12 analyzes work information of the worker, calculates a spatial divergence between actual work and model work included in consecutive instruction content indicating a model operation and state, and dynamically controls a display method for the consecutive instruction content based on a calculation result. The details of the process will be described below.

The content database 14 stores the consecutive instruction content to be presented to the worker. The consecutive instruction content is content that is configured with three-dimensional information, for example, presents a motion of fingers, a position of a head, or the like as a moving image to the worker, and gives an instruction for work content. Here, a human avatar or the like is preferably used because it is easy to understand work. As the content stored in the content database 14, text information indicating information regarding work by text, sound information indicating information regarding work by a sound, pointer information indicating a position for work, still image information indicating information regarding work by a still image, or moving image information indicating information regarding work by a moving image may be added in addition to the consecutive instruction content.

The communication unit 15 controls communication with another apparatus (for example, the edge processing apparatus 2).

Figure 4:
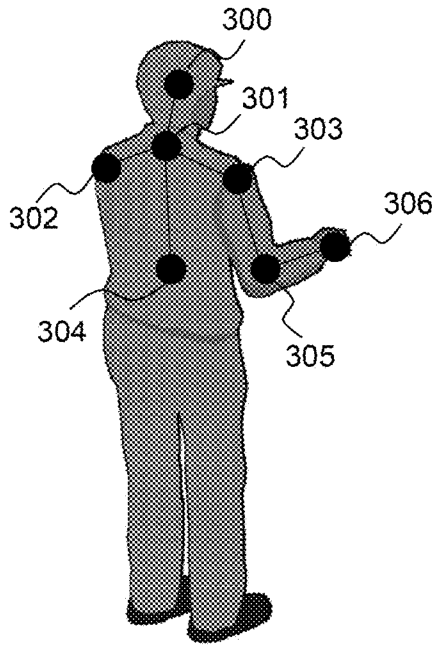
FIG. 4 is a diagram illustrating an example of work information according to Embodiment 1.
Figure 5:
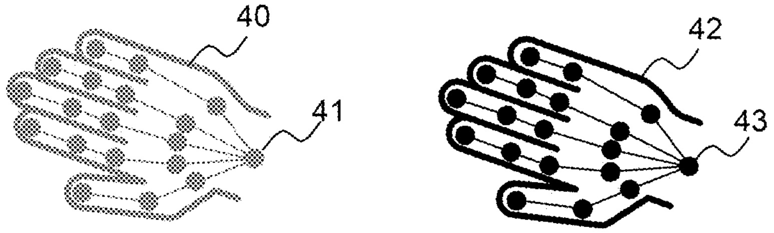
FIG. 5 is a diagram illustrating an example of the work information according to Embodiment 1.

FIGS. 4 and 5 are diagrams illustrating examples of work information used for the control unit 12 to calculate spatial divergences from consecutive instruction content according to Embodiment 1.

In an example illustrated in FIG. 4, work information is indicated by skeleton positional information of the worker. The work information is indicated by three-dimensional positional head 300, a neck 301, a left shoulder 302, a right shoulder 303, a waist 304, a right elbow 305, and a right wrist 306. The control apparatus 8 acquires the three-dimensional positional information from the imaging apparatus 1 or the MR device 5. In particular, position coordinates and an attitude of the head of the worker acquired by the MR device 5 may be used as positional information of the head 300. When an FOV of the MR device 5 and the position coordinates and the attitude of the head are acquired, it can be determined whether content to be described below can be viewed.

In the example illustrated in FIG. 5, work information is expressed with hand skeleton information, and the work information is expressed with three-dimensional positional information of fingers 40 and a hand skeleton 41 of an avatar performing a model operation in the consecutive instruction content, and fingers 42 of the worker and a hand skeleton 43 of the worker. As described above, the control apparatus 8 acquires the three-dimensional positional information from the imaging apparatus 1 or the MR device 5. In particular, the hand skeleton information includes a plurality of pieces of positional information such as the base of a wrist and each fingertip. For example, positional information of each skeleton point during an operation performed using fingers, such as holding of an object or tightening of a screw, can be acquired.

By including the same skeleton positional information as those of FIGS. 4 and 5 in the consecutive instruction content, it is possible to calculate a spatial divergence from the consecutive instruction content. A calculation example of the spatial divergence in the control unit 12 will be described with reference to FIGS. 6A to 9C.

Figure 6A:
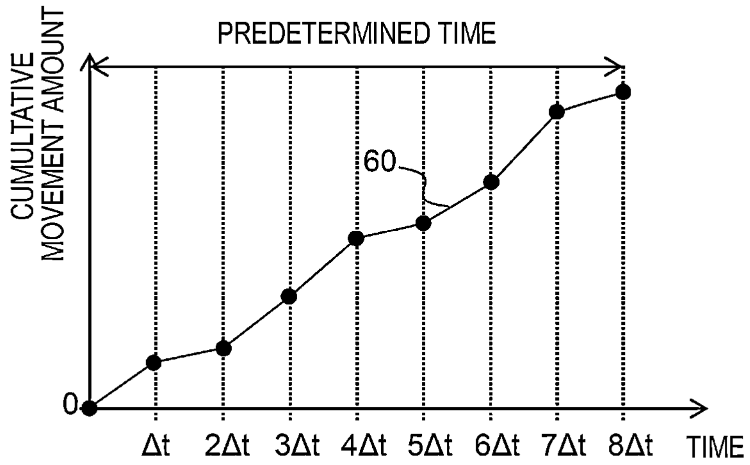
FIG. 6A is a diagram illustrating an example of calculation of a spatial divergence from consecutive instruction content according to Embodiment 1.
Figure 6B:
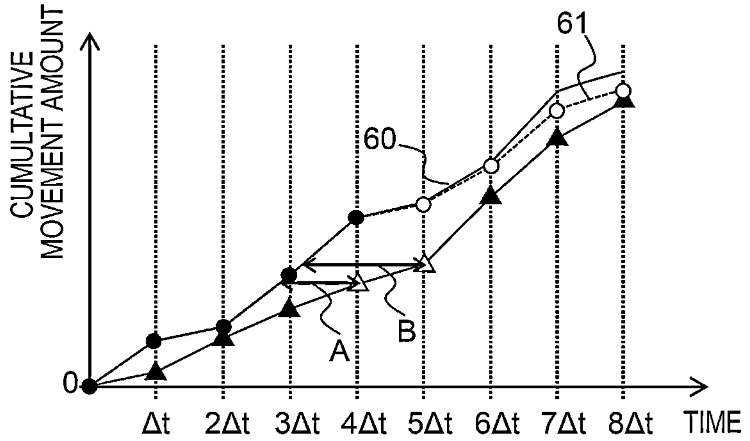
FIG. 6B is a diagram illustrating an example of calculation of the spatial divergence from the consecutive instruction content according to Embodiment 1.
Figure 6C:
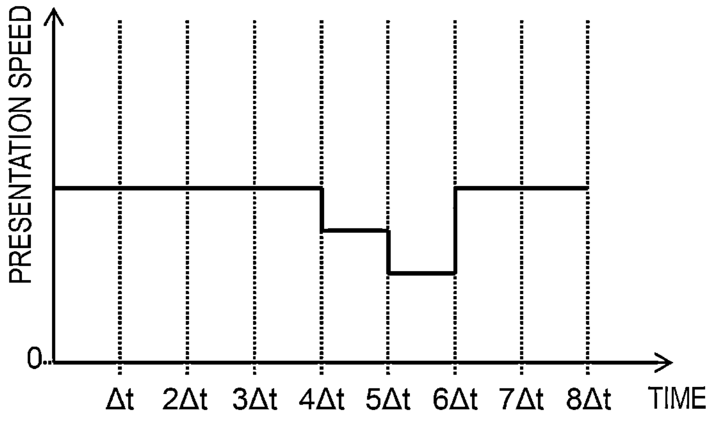
FIG. 6C is a diagram illustrating an example of calculation of the spatial divergence from the consecutive instruction content according to Embodiment 1.

FIGS. 6A to 6C are diagrams illustrating examples of calculation of spatial divergences from consecutive instruction content, focusing on points with largest positional changes in a predetermined time according to Embodiment 1.

FIG. 6A is a diagram in which a cumulative value of a space movement amount of a feature point with a largest positional change in the consecutive instruction content within a predetermined time is plotted in a time unit finer than the predetermined time. For example, an interval of 0 to 8Δt is divided as a predetermined time and a circle mark is plotted. When a point with a largest positional change of the consecutive instruction content within the predetermined time is the right wrist 306, a space movement amount of the right wrist 306 is added for each Δt and is plotted with a circle mark. The control unit 12 calculates a cumulative movement amount 60 that is a movement amount of a feature point of the consecutive instruction content.

FIG. 6B is a diagram in which a movement amount of the consecutive instruction content is plotted with a circle mark, the worker imitates an operation of the consecutive instruction content, and a space movement amount of the right wrist 306 of the worker during work is added for each Δt and is plotted with a triangle mark.

The control unit 12 compares the cumulative movement amount of the worker with the cumulative movement amount of the consecutive instruction content at each of the divided times (at nΔt elapsed time, in which n is an integer of 1 to 8). Since a temporal difference that is the same cumulative movement amount is Δt or less at Δt elapsed time, at 2Δt elapsed time, and at 3Δt elapsed time, the control unit 12 determines that the worker is following an operation of the consecutive instruction content. Since a temporal difference A that is the same cumulative movement amount is Δt or more at 4Δt elapsed time, the control unit 12 determines that the worker is not following an operation of the consecutive instruction content. As illustrated in FIG. 6C, control is performed such that a presentation speed of the consecutive instruction content at 4Δt decreases. Since a temporal difference B that is the same cumulative movement amount is Δt or more at 5Δt elapsed time, the control unit 12 determines that the worker is not following an operation of the consecutive instruction content. As illustrated in FIG. 6C, control is performed such that the presentation speed of the consecutive instruction content at 5Δt further decreases. Similarly, since a temporal difference that is the same cumulative movement amount is Δt or less at 6Δt elapsed time, the control unit 12 determines that the worker is following an operation of the consecutive instruction content. As illustrated in FIG. 6C, control is performed such that a presentation speed of the consecutive instruction content at 6Δt is a standard speed. Since the presentation speed of the consecutive instruction content changes at 4Δt elapsed time and at 5Δt elapsed time, a cumulative movement amount of the consecutive instruction content may be a cumulative movement amount 61 later than the cumulative movement amount 60 of the standard consecutive instruction content and a spatial divergence may be calculated for every Δt with respect to the cumulative movement amount 61 after the change in the presentation speed of the content.

In the examples illustrated in FIGS. 6A to 6C, the description is made focusing on one point with the largest positional change within the predetermined time, but positional changes of a plurality of points may be focused on. For example, in the case of an operation in which both hands are used, finger positions of both hands may be used as feature points and the spatial divergence may be calculated using the plurality of feature points. The spatial divergence may be calculated using statistical values of the positions of a plurality of feature points (for example, sum values of coordinates).

A method of changing a presentation speed may be controlled step by step using a plurality of thresholds. For example, when r is a cumulative movement amount at any time, v1 is an average speed of the consecutive instruction content at the r cumulative movement amount, t1 is an elapsed time of the consecutive instruction content, v2 is an average speed of the worker at the r cumulative movement amount, and t2 is an elapsed time of the worker, a temporal difference t2–t1 that is the same cumulative movement amount can be calculated using the following formula.

$$t2 - t1 = r(1/v2 - 1/v1) \tag{1}$$

Figure 6D:
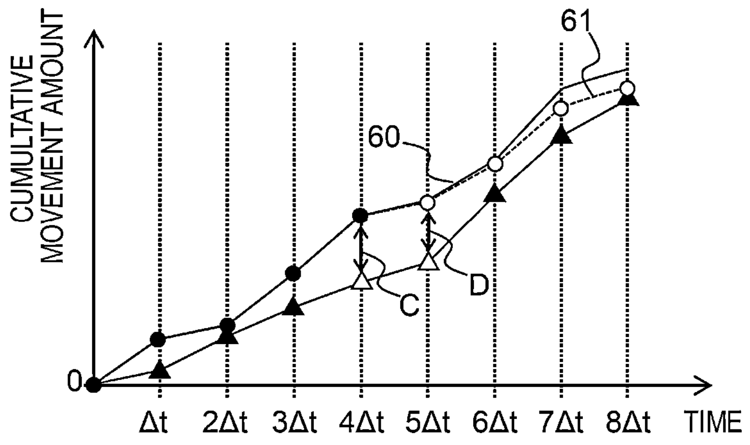
FIG. 6D is a diagram illustrating another example of calculation of the spatial divergence from the consecutive instruction content according to Embodiment 1.

FIG. 6D is a diagram illustrating another example of calculation of the spatial divergence from the consecutive instruction content, focusing on a point with a largest positional change in a predetermined time according to Embodiment 1. In the examples illustrated in FIGS. 6A to 6C, it is determined whether the worker is following the operation of the consecutive instruction content according to the temporal difference that is the same cumulative movement amount. In the example illustrated in FIG. 6D, however, it is determined that the worker is following an operation of the consecutive instruction content according to a difference in the cumulative movement amount of the same time.

FIG. 6D is a diagram in which a cumulative value of a space movement amount of a feature point with a largest positional change in the consecutive instruction content is plotted in a time unit (Δt) finer than a predetermined time with a circle mark, the worker imitates an operation of the consecutive instruction content, and a space movement amount of the right wrist 306 of the worker during work is added for each Δt and is plotted with a triangle mark.

The control unit 12 compares the cumulative movement amount of the worker with the cumulative movement amount of the consecutive instruction content at each of the divided times (at nΔt elapsed time, in which n is an integer of 1 to 8). Since a difference in the cumulative movement amount is equal to or less than a predetermined threshold at Δt elapsed time, at 2Δt elapsed time, and at 3Δt elapsed time, the control unit 12 determines that the worker is following an operation of the consecutive instruction content. Since a difference between the cumulative movement amount of the worker and the cumulative movement amount of the consecutive instruction content is the predetermined threshold or more at 4Δt elapsed time, the control unit 12 determines that the worker is not following the operation of the consecutive instruction content. As illustrated in FIG. 6C, control is performed such that a presentation speed of the consecutive instruction content at 4Δt decreases. Since the difference between the cumulative movement amount of the worker and the cumulative movement amount of the consecutive instruction content is the predetermined threshold or more at 5Δt elapsed time, the control unit 12 determines that the worker is not following the operation of the consecutive instruction content. As illustrated in FIG. 6C, control is performed such that the presentation speed of the consecutive instruction content further decreases at 5Δt. Similarly, since the difference between the cumulative movement amount of the worker and the cumulative movement amount of the consecutive instruction content is the predetermined threshold or less at 6Δt elapsed time, the control unit 12 determines that the worker is following the operation of the consecutive instruction content. As illustrated in FIG. 6C, control is performed such that a presentation speed of the consecutive instruction content at 6Δt is a standard speed. Since the presentation speed of the consecutive instruction content changes at 4Δt elapsed time and at 5Δt elapsed time, a cumulative movement amount of the consecutive instruction content may be the cumulative movement amount 61 later than the cumulative movement amount 60 of the standard consecutive instruction content and a spatial divergence may be calculated for every Δt with respect to the cumulative movement amount 61 after the change in the presentation speed of the content.

In the examples illustrated in FIG. 6D, the description has been made focusing on one point with the largest positional change within the predetermined time, but the point only needs to be a point with positional change of a predetermined value or more (a point that moves by a predetermined distance or more). Positional changes of a plurality of points may be focused on. For example, in the case of an operation in which both hands are used, finger positions of both hands may be used as feature points and the spatial divergence may be calculated using the plurality of feature points. The spatial divergence may be calculated using statistical values of the positions of a plurality of feature points (for example, sum values of coordinates).

A method of changing a presentation speed may be controlled step by step. For example, in the above-described examples, the difference between the cumulative movement amount of the worker and the cumulative movement amount of the consecutive instruction content exceeds a predetermined threshold consecutively a plurality of times, and thus the presentation speed decreases step by step.

As such, since the presentation speed of the consecutive instruction content is controlled in a plurality of steps according to a temporal difference that is the same cumulative movement amount or a difference in the cumulative movement amount, that is, the magnitude of the spatial divergence, the worker can follow the consecutive instruction content appropriately.

Figure 7A:
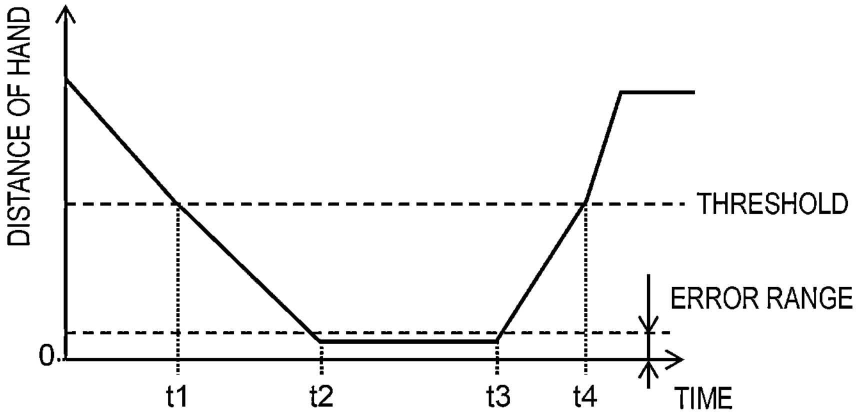
FIG. 7A is a diagram illustrating an example of calculation of the spatial divergence of a worker from the consecutive instruction content according to Embodiment 1.
Figure 7B:
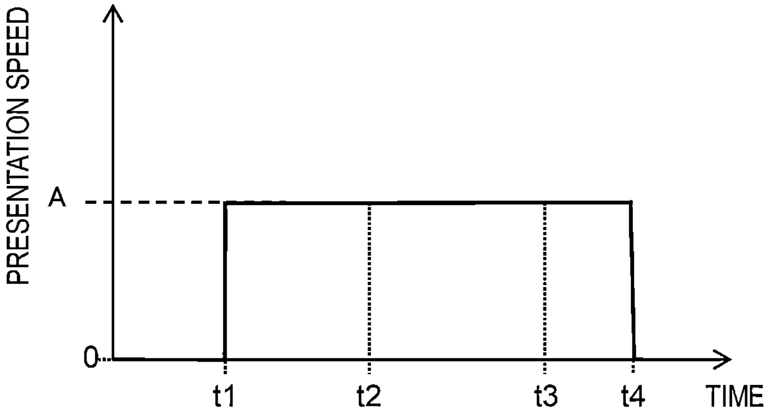
FIG. 7B is a diagram illustrating an example of calculation of the spatial divergence of the worker from the consecutive instruction content according to Embodiment 1.
Figure 7C:
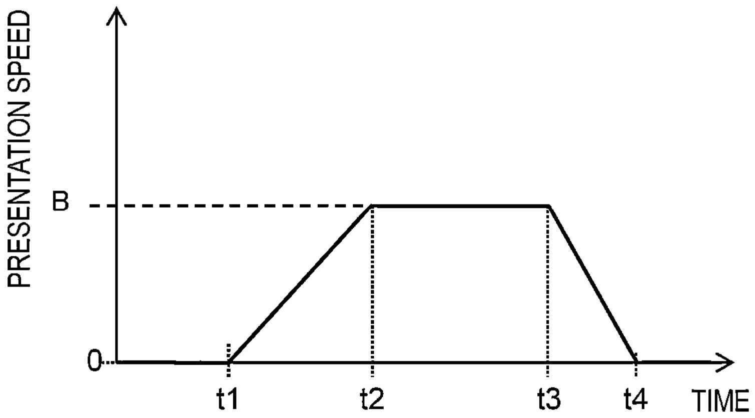
FIG. 7C is a diagram illustrating an example of calculation of a spatial divergence of the worker from the consecutive instruction content according to Embodiment 1.

FIGS. 7A to 7C are diagrams illustrating examples of calculation of a spatial divergence of the worker and the consecutive instruction content, focusing on positions of feature points of the consecutive instruction content and position coordinates of work information of the worker corresponding to the feature points according to Embodiment 1.

FIG. 7A is a diagram illustrating a distance between a feature point of the worker and a feature point of the consecutive instruction content. For example, when skeleton information of the tip of a right index finger is a feature point, a chronological change of a spatial distance between the tip of the right index finger of the worker and the position of the tip of the right index finger of a model person in the consecutive instruction content is illustrated. That is, when the worker imitates an operation of the consecutive instruction content correctly, a distance between the feature points is a value close to 0. FIG. 7B is a diagram illustrating an example of a presentation speed.

An operation of the control unit 12 will be described with reference to FIGS. 7A and 7B. A distance between the feature points is a predetermined threshold or more from time 0 to time t1, and the control unit 12 sets a presentation speed of the consecutive instruction content to 0 and presents content. That is, the consecutive instruction content is stopped and an avatar in the consecutive instruction content is presented to the worker in the stopped state. When the worker approaches the avatar in the consecutive instruction content to imitate an operation, a distance between the feature points after time t1 becomes the predetermined threshold or less. Here, as illustrated in FIG. 7B, the control unit 12 presents the content by A times a standard speed as the presentation speed. Subsequently, the content is presented by A times the standard speed until time t4 at which the distance between the feature points exceeds the predetermined threshold. When the distance between the feature points exceeds the predetermined threshold at time t4, the control unit 12 sets the presentation speed of the consecutive instruction content to 0 and presents the content. As such, by controlling the presentation speed of the content according to a distance between the worker and the avatar, the content can be reproduced when the worker approaches to imitate the consecutive instruction content. When the work is interrupted or an operation different from work which should be originally performed is performed, the content can be stopped and the content can be prevented from being missed.

In the example illustrated in FIG. 7B, the presentation speed of the consecutive instruction content has been controlled at two types of speeds, 0 and A times the standard speed, but another control method may be used. For example, as illustrated in FIG. 7C, the presentation speed of the consecutive instruction content may be changed consecutively. In FIG. 7C, as the distance between the feature points decreases from time t1, the presentation speed becomes fast, the presentation speed is set to B times the standard speed to present the content between time t2 to time t3 at which the distance between the feature points is almost 0 (an error range of FIG. 7A). As the distance between the feature points increases between time t3 to time t4, the presentation speed is slowed down. As such, by controlling the presentation speed of the content according to the distance between the worker and the avatar, it is possible to improve followability of the worker to the consecutive instruction content. By setting a value of B to a value equal to or greater than 1, it is possible to increase a work speed and improve work efficiency.

Figure 8:
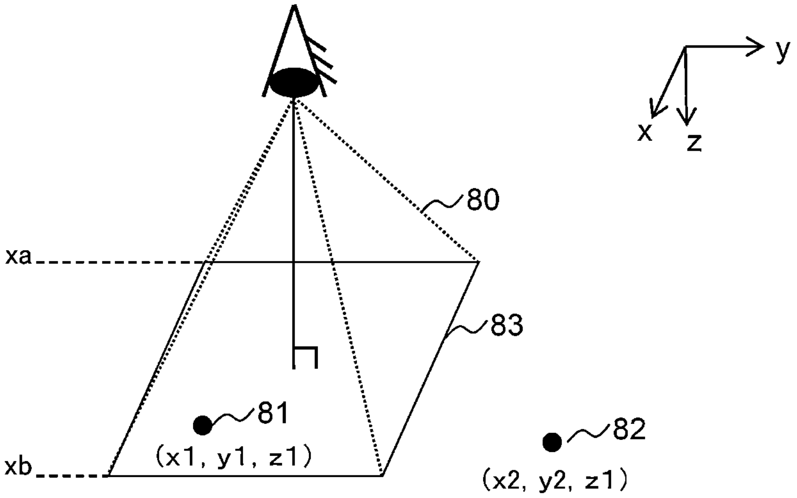
FIG. 8 is a diagram illustrating whether feature points of the consecutive instruction content are within a field of view of the worker according to Embodiment 1.

FIG. 8 is a diagram illustrating whether feature points of the consecutive instruction content are within a field of view of the worker according to Embodiment 1.

A case in which the worker is facing straight along a +z axis will be described for simplicity. When a field of view (FOV) 80 of the MR device 5 is obtained, a space range that can be displayed by the MR device 5 is determined. For example, when positional s (x1, y1, z1) of a feature point 81 of the consecutive instruction content is known, a field-of-view range 83 on an xy plane at z=z1 that can be displayed by the MR device 5 is obtained. In the example illustrated in FIG. 8, the feature point 81 is included in the field-of-view range 83 of the worker and can be viewed by the worker. On the other hand, position coordinates (x2, y2, z1) of a feature point 82 of different consecutive instruction content are not included in the field-of-view range 83 of the worker, and thus cannot be viewed by the worker. As such, a process of the control unit 12 at a spatial divergence between the feature point of the consecutive instruction content and the field of view will be described with reference to FIGS. 9A to 9C.

Figure 9A:
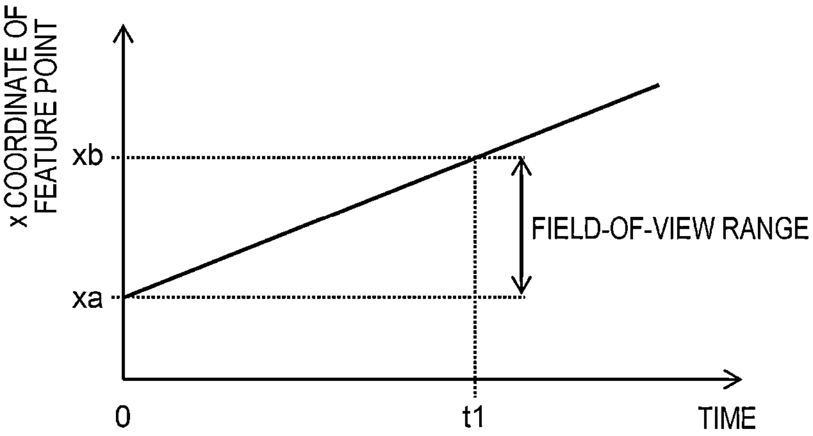
FIG. 9A is a diagram illustrating an example of a relation between the field of view and the feature points of the consecutive instruction content according to Embodiment 1.
Figure 9B:
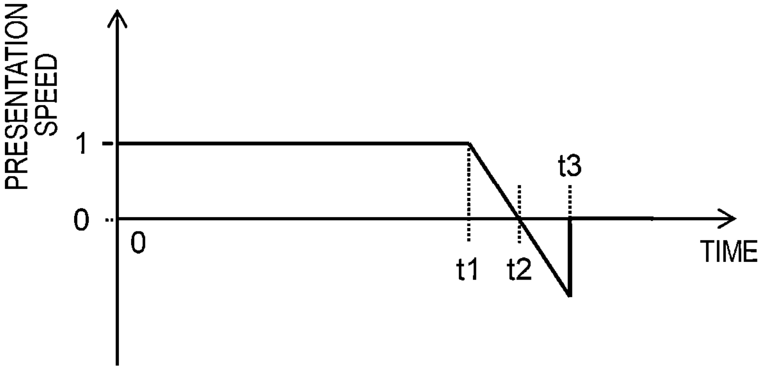
FIG. 9B is a diagram illustrating an example of a relation between the field of view and the feature points of the consecutive instruction content according to Embodiment 1.
Figure 9C:
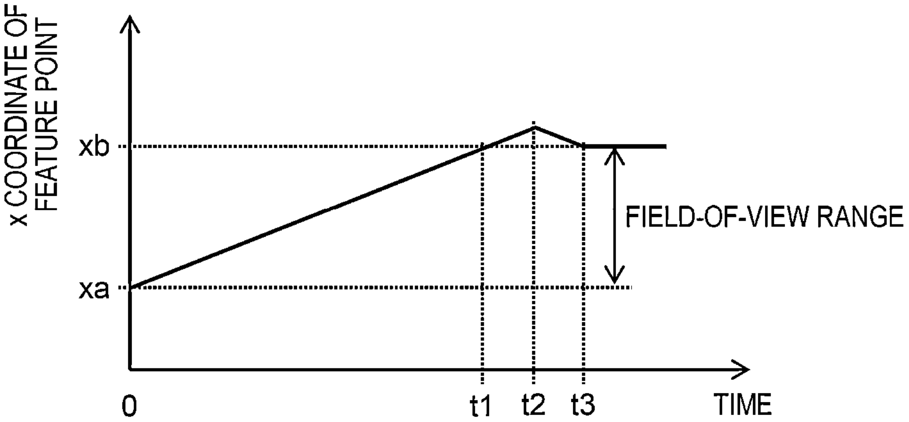
FIG. 9C is a diagram illustrating an example of a relation between the field of view and the feature points of the consecutive instruction content according to Embodiment 1.

FIGS. 9A to 9C are diagrams illustrating examples of relations between field of views and feature points of the consecutive instruction content according to Embodiment 1.

A case in which the worker is facing straight along the +z axis will be described for simplicity as in FIG. 8. It is conceivable that a feature point in the consecutive instruction content is moved at a uniform speed in a +x direction on an xy plane at z=z1.

FIG. 9A illustrates a chronological change of an x coordinate of a feature point of the consecutive instruction content when a presentation speed is not changed. In the case illustrated in FIG. 9A, x=xa indicates coordinates of an end on the −x side in FIG. 8 and x=xb indicates coordinates of an end on the +x side on the xy plane 83 at z=z1. That is, a field-of-view range of the worker in the x direction is a range from xa to xb. When the content is moving in a z axis direction, thresholds of xa and xb determining the field-of-view range change. For example, when the content moves in the +z axis direction, xb−xa determining the field-of-view range increases. When the content moves in the −z axis direction, xb−xa determining the field-of-view range decreases. A feature point illustrated in FIG. 9A is outside of the field of view of the worker at time t1, and thus the worker cannot view the feature point.

An operation of the control unit 12 will be described with reference to FIGS. 9A and 9B. The control unit 12 determines whether a feature point of the consecutive instruction content is included within the field of view of the MR device 5. For example, the feature point of the consecutive instruction content is within the field of view between time 0 to time t1 of FIG. 9A and the control unit 12 presents the consecutive instruction content at the standard speed. At time t1, when the control unit 12 determines that the feature point of the consecutive instruction content is not included within the field of view, the control unit 12 performs control such that the presentation speed gradually slows down. A presentation speed of the content at time t2 becomes 0 and the content stops. Further, the control unit 12 determines whether the feature point of the consecutive instruction content is included within the field of view. When the control unit 12 determines that the feature point of the consecutive instruction content is included within the field of view, the control unit 12 sets the presentation speed to a value equal to or less than 0 and reversely reproduces the consecutive instruction content. In FIG. 9B, a presentation speed is set to a negative value between time t2 to time t3, so that the content is reversely reproduced. When the feature point of the consecutive instruction content is returned within the field of view at time t3, the presentation speed is set to 0 and the content stops. That is, it is determined whether the feature point of the consecutive instruction content is included within the field of view, the presentation speed is changed, and then the feature point of the consecutive instruction content is moved within the field of view as in FIG. 9C. When the feature point of the consecutive instruction content greatly deviates from the field of view and a reverse reproduction time exceeds a predetermined time, the consecutive instruction content may not be reversely produced. As such, by controlling the presentation speed of the content according to whether the feature point of the consecutive instruction content is included within the field of view, it is possible to return the content deviating outside of the field of view of the MR device 5 within the field of view, and thus prevent missing of the content.

Figure 10:
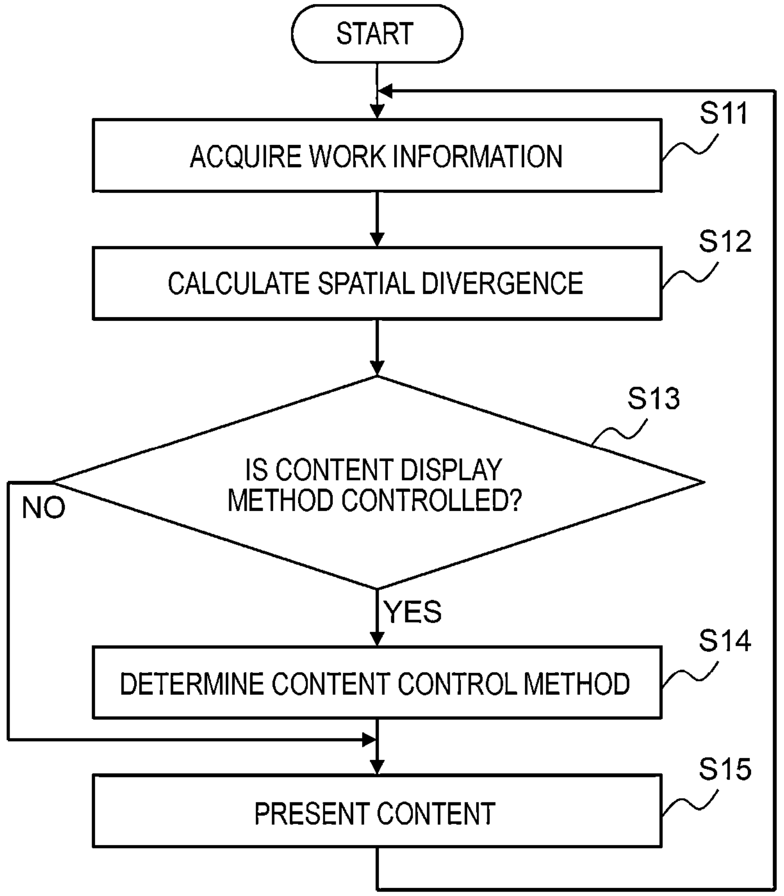
FIG. 10 is a flowchart illustrating a process performed by the control apparatus according to Embodiment 1.

FIG. 10 is a flowchart illustrating a process performed by the control apparatus 8 according to Embodiment 1.

First, the work information acquisition unit 10 acquires work information from the imaging apparatus 1 and the MR device 5 and transmits the work information to the control unit 12 (S11).

Subsequently, the control unit 12 acquires the consecutive instruction content from the content database 14, analyzes the acquired work information with reference to the acquired consecutive instruction content, and calculates a spatial divergence (S12). For example, based on at least one of a difference between the space movement amount of a feature point with the largest positional change within the predetermined time and the space movement amount of the feature point of the consecutive instruction content, as illustrated in FIGS. 6B and 6D, a distance between the position of the feature point of the consecutive instruction content and the position of the work information of the worker corresponding to the feature point, as illustrated in FIG. 7A, and a relation between the feature point of the consecutive instruction content and the field of view of the worker, as illustrated in FIGS. 9A to 9C, the spatial divergence is calculated. The plurality of above-described examples may be determined comprehensively. For example, the examples may be determined according to both of whether the feature point of the consecutive instruction content is within the field of view of the MR device 5 and the distance between the feature points.

Subsequently, based on the calculated spatial divergence, the control unit 12 determines whether the method of displaying the content is controlled (S13). When the spatial divergence is large in step S13, the worker is not following the consecutive instruction content. Therefore, the control unit 12 determines to control the method of displaying the content and controls the method in a direction in which the presentation speed of the content decreases (S14). When the spatial divergence is small, the worker is following the consecutive instruction content. Therefore, the control unit 12 may determine to control the method of displaying the content and may control the method in a direction in which the presentation speed of the content increases. By controlling the method of displaying the content according to the spatial divergence, it is possible to improve followability of the worker to the consecutive instruction content and improve work efficiency.

Conversely, when it is determined in step S13 to not control the method of displaying the content, the presentation speed of the content is maintained.

Then, the output unit 13 transmits the content to the MR device 5 at the presentation speed determined in step S14 or a current presentation speed and presents the content of which the presentation speed is adjusted to the worker (S15).

As described above, according to Embodiment 1 of the present invention, by acquiring the work information of the worker, detecting a divergence from an ideal operation or state indicated by the consecutive instruction content, and dynamically controlling the method of displaying the content, it is possible to improve the work efficiency of the worker.

In the present embodiment, the work support system in which augmented reality is used is exemplified, but the present invention may be applied to the work support system in which virtual reality is used. That is, the control apparatus 8 may reconstruct a situation of a site in a three-dimensional virtual space based on three-dimensional information collected from one or a plurality of edge processing apparatuses 2, acquire the work information of the worker in the three-dimensional virtual space, detect a divergence from the ideal operation or state indicated by the consecutive instruction content, and dynamically control the method of displaying the content. The present invention may also be applied to a work support education system that improves an education effect of the worker.

Embodiment 2

In Embodiment 2, a divergence between an ideal operation or state and an operation or state of a worker is detected and information is added to content to improve work efficiency of the worker. In Embodiment 2, differences from the above-described Embodiment 1 will be mainly described and description of the same configurations and functions as those of Embodiment 1 will be omitted.

Figure 11:
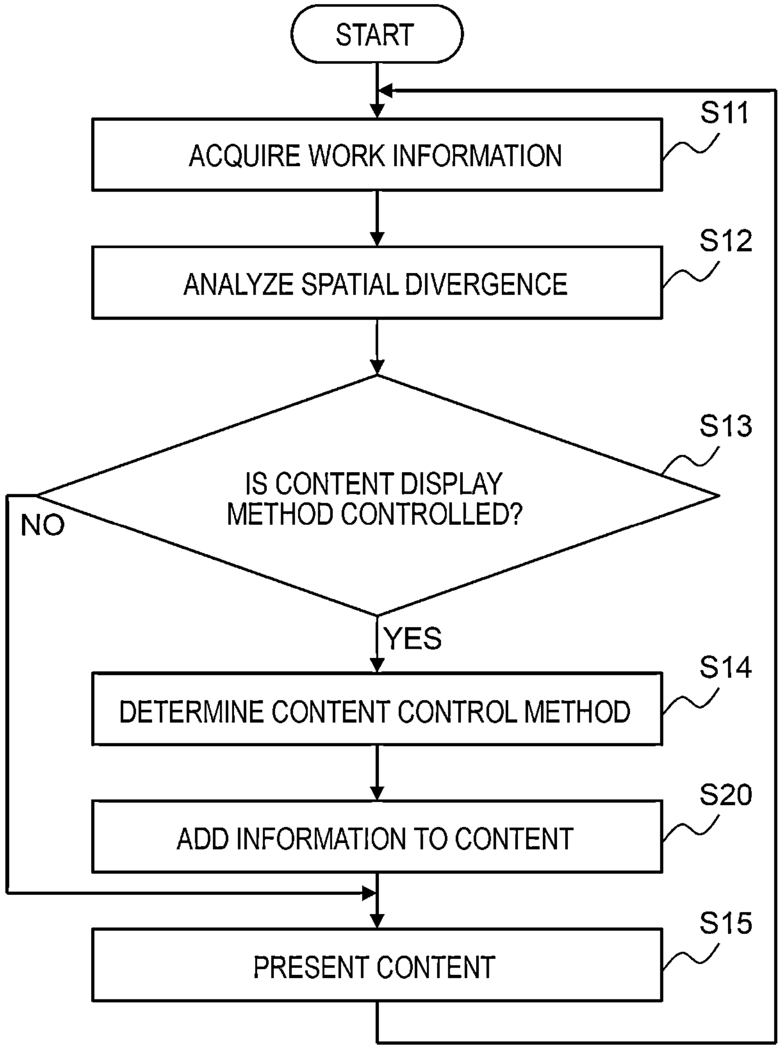
FIG. 11 is a flowchart illustrating a process performed by a control apparatus according to Embodiment 2.

FIG. 11 is a flowchart illustrating a process performed by the control apparatus 8 according to Embodiment 2.

In Embodiment 2, the work information acquisition unit 10 acquires the work information from the imaging apparatus 1 and the MR device 5 and transmits the work information to the control unit 12 (S11). Subsequently, the control unit 12 analyzes the acquired work information, calculates the spatial divergence (S12), and determines whether to control the method of displaying the content based on the calculated spatial divergence (S13). The control unit 12 controls the presentation speed of the content in the direction in which the presentation speed of the content decreases according to a determination result of step S13 (S14). The processes of steps S11 to S14 are the same as those of the above-described Embodiment 1.

Thereafter, the control unit 12 adds information to the consecutive instruction content or generates additional information that is presented to the worker (S20). Accordingly, the worker can be aware that there is a spatial divergence.

For example, the worker can be aware that the spatial divergence is large by changing color, a size, or brightness of the consecutive instruction content or blinking the consecutive instruction content according to magnitude of the spatial divergence. Specifically, by displaying the color or edge of the consecutive instruction content as cold color (blue or the like) when the spatial divergence is small and displaying the color or edge of the consecutive instruction content to warm color (red or the like) when the spatial divergence is large, it is possible to present content in which a scale of the spatial divergence is intuitively ascertained. By displaying the consecutive instruction content small when the spatial divergence is small and displaying the consecutive instruction content largely when the spatial divergence is large, it is possible to present the content so that the content can be easily recognized when the spatial divergence is large. By displaying the consecutive instruction content brightly when the spatial divergence is large, it is possible to present the content so that the content can be easily recognized when the spatial divergence is large. By slowly blinking and displaying the consecutive instruction content when the spatial divergence is small and constantly displaying the consecutive instruction content when the spatial divergence is large, it is possible to recognize only an operation of the worker during imitating of the consecutive instruction content at a timing at which the consecutive instruction content disappears and confirm whether the consecutive instruction content is correctly imitated. As another method, a trajectory of the consecutive instruction content may be displayed and the worker may ascertain the spatial divergence.

Further, as a method other than the method of adding information to the consecutive instruction content, text for reminding the worker that there is a difference in an operation may be displayed, a correct work procedure image may be displayed, a warning sound may be output, or tactile information such as vibration may be conveyed to inform the worker that the spatial divergence is large. For example, when the consecutive instruction content is outside of a field of view of the MR device 5 as in the example illustrated in FIG. 9A, information indicating a position at which the consecutive instruction content stops may be presented as additional information. Specifically, a difference value from positional information of the head of the worker may be displayed with reference to positional information of the head of the avatar inside the consecutive instruction content, and a position of the consecutive instruction content may be ascertained. A straight line connecting a feature point of the consecutive instruction content to a corresponding feature point of the worker may be displayed on the MR device 5 and a position of the consecutive instruction content may be displayed so that the position of the consecutive instruction content can be intuitively known.

Then, the output unit 13 transmits the content to which the information is added in step S20 to the MR device 5 and presents the content of which the presentation speed is adjusted to the worker (S15).

As such, the worker can easily ascertain the divergence from the ideal operation or state, and it is possible to improve the work efficiency of the worker.

As described above, according to Embodiment 2 of the present invention, by adding information to the content so that the worker can be aware of the divergence from the ideal operation or state, it is possible to improve the work efficiency of the worker in addition to the advantages of Embodiment 1.

Embodiment 3

In Embodiment 3, the operation determination unit 200 determines whether the operation of the worker is correct. When the operation of the worker is incorrect, the correct work can be reliably performed by generating operation correction content. In Embodiment 3, differences from the above-described Embodiment 1 will be mainly described and description of the same configurations and functions as those of Embodiment 1 will be omitted.

Figure 12:
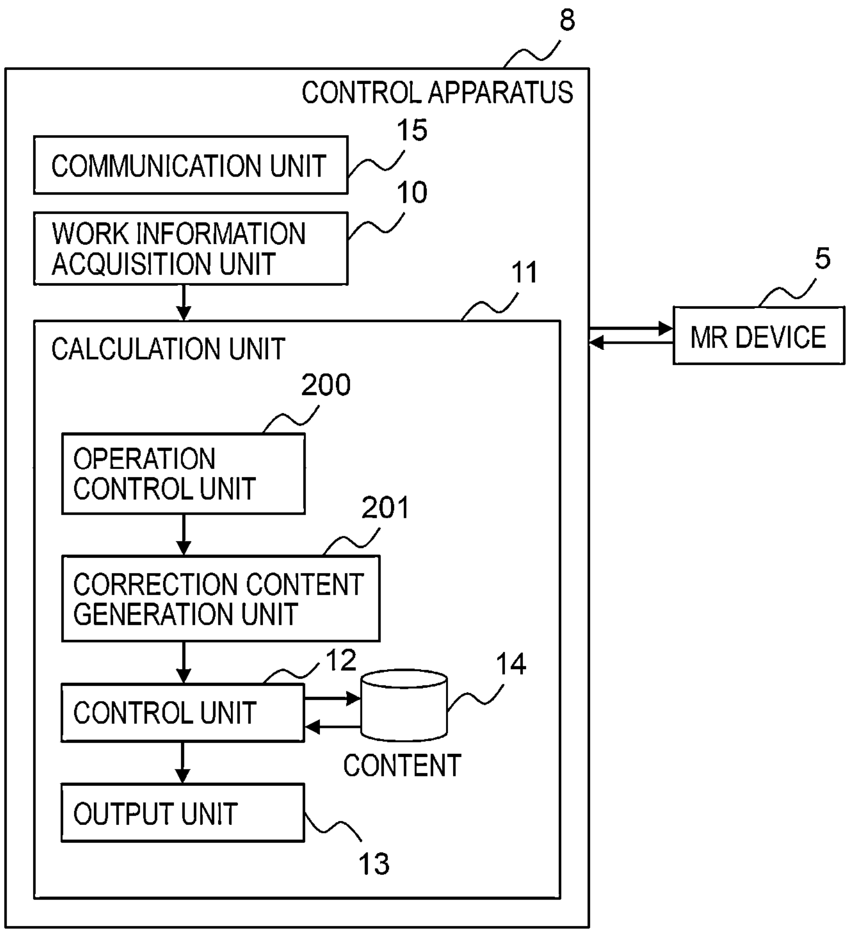
FIG. 12 is a logical block diagram illustrating a control apparatus according to Embodiment 3.

FIG. 12 is a logical block diagram illustrating the control apparatus 8 according to Embodiment 3.

The control apparatus 8 according to Embodiment 3 includes the work information acquisition unit 10, the calculation unit 11, the communication unit 15, an operation determination unit 200, and a correction content generation unit 201. The calculation unit 11 includes the control unit 12, the output unit 13, and the content database 14. The work information acquisition unit 10, the calculation unit 11, the control unit 12, the output unit 13, the content database 14, and the communication unit 15 are the same as those of the above-described embodiments.

The operation determination unit 200 determines whether the worker is performing a correct operation from the work information of the worker. For example, when it is necessary for a feature point of the consecutive instruction content to pass through a predetermined point (x, y, z), and when the worker operates without a feature point of the worker passing through a predetermined range from the predetermined point, the operation determination unit 200 determines that the worker performed an incorrect operation.

When the operation determination unit 200 determines that the worker performed the incorrect operation, the correction content generation unit 201 generates correction content for returning the incorrect operation to the correct operation. For example, when it is necessary for the feature point to pass through the predetermined point (x, y, z) and work information passing through a different point (x', y', z') is observed, correction content for moving the feature point from position coordinates at which current worker information is observed to the predetermined point (x, y, z) is generated. By displaying text or an icon such as a figure for informing to the worker that a previous operation was incorrect when the correction content is presented, it is possible for the worker to easily recognize that the operation was incorrect.

Figure 13:
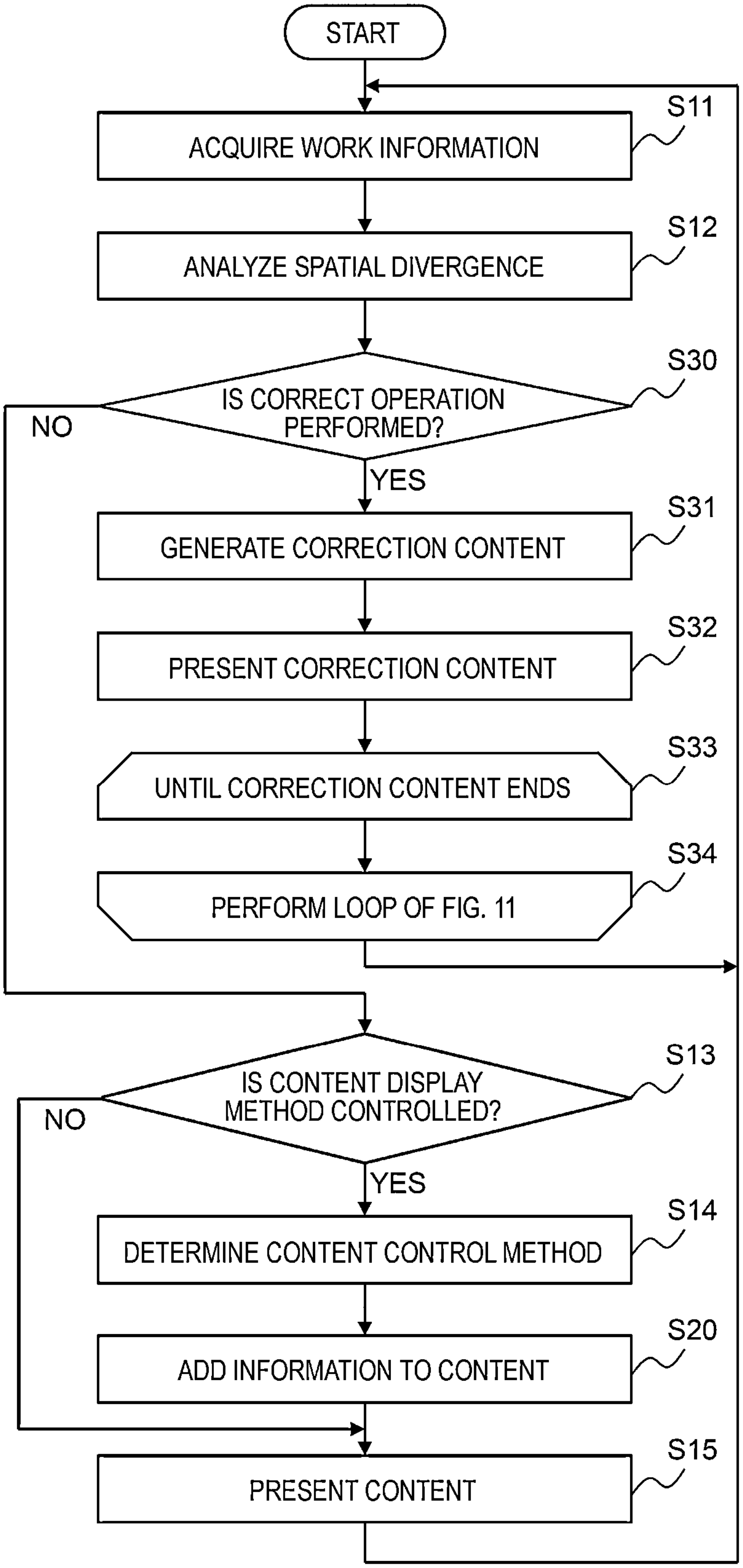
FIG. 13 is a flowchart illustrating a process performed by the control apparatus according to Embodiment 3.

FIG. 13 is a flowchart illustrating a process performed by the control apparatus 8 according to Embodiment 3.

In Embodiment 3, the work information acquisition unit 10 acquires the work information from the imaging apparatus 1 and the MR device 5 and transmits the work information to the control unit 12 (S11). Subsequently, the control unit 12 analyzes the acquired work information and calculates the spatial divergence (S12).

Subsequently, the operation determination unit 200 analyzes whether the worker is performing a correct operation (S30). When the operation determination unit 200 determines that the operation is incorrect, the correction content generation unit 201 generates the correction content (S31) and starts presenting the generated correction content (S32). Until the presenting of the correction content ends, the loop of steps S11 to S15 (FIG. 11) according to Embodiment 2 is performed and the correction content to which information is added is presented to the worker at a controlled presentation speed (S33 and S34). As such, it is possible to generate the content for correcting the incorrect operation and returning to the correct operation when the incorrect operation is performed and present the content to the worker, and thus it is possible to reliably perform correct work.

Conversely, when the operation determination unit 200 determines that the operation is correct, the control unit 12 determines whether to control the method of displaying the content based on the calculated spatial divergence (S13). The control unit 12 controls the presentation speed of the content in the direction in which the presentation speed of the content decreases according to a determination result of step S13 (S14). The processes of steps S11 to S14 are the same as those of the above-described Embodiment 1.

As described above, according to Embodiment 3 of the present invention, it is possible to reduce an operational error in addition to the advantages of Embodiment 1.

The present invention is not limited to the above-described embodiments, and various modifications and equivalent configurations within the gist of the appended claims are included. For example, the above-described embodiments are described in detail to facilitate understanding of the present invention and the configurations described above may not be all included. Some of the configurations of a certain embodiment can be replaced with the configurations of another embodiment. Some of the configurations of a certain embodiment can be added to the configurations of another embodiment. Other configurations may be added to, deleted from, and replaced with some of the configurations of each embodiment.

Some or all of the above-described configurations, functions, processing units, processing methods, and the like may be implemented as hardware by designing integrated circuits or may be implemented as software by causing a processor to compile and execute a program that implements each function.

Information such as a program, a table, or a file implementing each function can be stored in a storage device such as a memory, a hard disk, or a solid state drive (SSD) or a recording medium such as an IC card, an SD card, or a DVD.

Control lines or information lines indicate lines considered to be necessary for description and are not all the control lines and information lines necessary for implementation. Actually, substantially all the configurations are considered to be connected to each other.

What is claimed is:

1. A control apparatus that presents a three-dimensional operation to a worker using cross reality, comprising:

a computer including a calculation device that performs a predetermined calculation process and a storage device that the calculation device is able to access, wherein the calculation device includes an acquisition unit that acquires work information of work performed by the worker, wherein the calculation device includes a calculation unit that performs calculation to present consecutive instruction content corresponding to the work performed by the worker to the worker, wherein the calculation device includes an output unit that outputs content, wherein the calculation unit includes a control unit that dynamically controls a display method for the consecutive instruction content according to a spatial divergence between the work information acquired by the acquisition unit and the consecutive instruction content, wherein the control unit changes a presentation speed of the consecutive instruction content according to a spatial divergence between the work information and the consecutive instruction content, and wherein the control unit determines that the spatial divergence between the work information and the consecutive instruction content is large when a time at which a first feature point with a largest positional change within a predetermined time and a second feature point included in the consecutive instruction content corresponding to the first feature point have an identical space movement amount among feature points included in the work information is distant by a predetermined threshold or more.

2. The control apparatus according to claim 1, wherein the control unit reduces a presentation speed of the consecutive instruction content or stops reproducing the consecutive instruction content when the spatial divergence between the work information and the consecutive instruction content is greater than a predetermined threshold.

3. The control apparatus according to claim 1, wherein the control unit reversely reproduces the consecutive instruction content when the spatial divergence between the work information and the consecutive instruction content is greater than a predetermined threshold.

4. The control apparatus according to claim 1, wherein the control unit controls a presentation speed of the consecutive instruction content in a plurality of stages according to the spatial divergence.

5. The control apparatus according to claim 1, wherein the control unit determines that the spatial divergence between the work information and the consecutive instruction content is large when the worker is not viewing the consecutive instruction content.

6. The control apparatus according to claim 1, wherein the control unit adds additional information generated according to work information acquired by the acquisition unit to the consecutive instruction content.

7. The control apparatus according to claim 1, wherein the calculation unit performs control such that operation correction content for returning the worker to a correct operation is displayed according to work information acquired by the acquisition unit.

8. A control apparatus that presents a three-dimensional operation to a worker using cross reality, comprising:

a computer including a calculation device that performs a predetermined calculation process and a storage device that the calculation device is able to access, wherein the calculation device includes an acquisition unit that acquires work information of work performed by the worker, wherein the calculation device includes a calculation unit that performs calculation to present consecutive instruction content corresponding to the work performed by the worker to the worker, wherein the calculation device includes an output unit that outputs content, wherein the calculation unit includes a control unit that dynamically controls a display method for the consecutive instruction content according to a spatial divergence between the work information acquired by the acquisition unit and the consecutive instruction content, wherein the control unit changes a presentation speed of the consecutive instruction content according to a spatial divergence between the work information and the consecutive instruction content, and wherein the control unit determines that the spatial divergence between the work information and the consecutive instruction content is large when a distance at a same time between a space movement amount of a first feature point with a largest positional change within a predetermined time and a space movement amount of a second feature point included in the consecutive instruction content corresponding to the first feature point among feature points included in the work information is distant by a predetermined threshold or more.

9. A control apparatus that presents a three-dimensional operation to a worker using cross reality, comprising:

a computer including a calculation device that performs a predetermined calculation process and a storage device that the calculation device is able to access, wherein the calculation device includes an acquisition unit that acquires work information of work performed by the worker, wherein the calculation device includes a calculation unit that performs calculation to present consecutive instruction content corresponding to the work performed by the worker to the worker wherein the calculation device includes an output unit that outputs content, wherein the calculation unit includes a control unit that dynamically controls a display method for the consecutive instruction content according to a spatial divergence between the work information acquired by the acquisition unit and the consecutive instruction content, wherein the control unit changes a presentation speed of the consecutive instruction content according to a spatial divergence between the work information and the consecutive instruction content, and wherein the control unit determines that the spatial divergence between the work information and the consecutive instruction content is large when a distance between a first feature point of a body of the worker included in the work information and a second feature point of a body of an avatar included in the consecutive instruction content corresponding to the first feature point is distant by a predetermined threshold or more.

10. A control apparatus that presents a three-dimensional operation to a worker using cross reality, comprising:

a computer including a calculation device that performs a predetermined calculation process and a storage device that the calculation device is able to access, wherein the calculation device includes an acquisition unit that acquires work information of work performed by the worker, wherein the calculation device includes a calculation unit that performs calculation to present consecutive instruction content corresponding to the work performed by the worker to the worker, wherein the calculation device includes an output unit that outputs content, wherein the calculation unit includes a control unit that dynamically controls a display method for the consecutive instruction content according to a spatial divergence between the work information acquired by the acquisition unit and the consecutive instruction content, wherein the control unit adds additional information generated according to work information acquired by the acquisition unit to the consecutive instruction content, and wherein the additional information is one or more of color of the consecutive instruction content, a size of the consecutive instruction content, brightness of the consecutive instruction content, blinking of the consecutive instruction content, a trajectory of a point in the consecutive instruction content, text information provided together with the consecutive instruction content, a work procedure image provided together with the consecutive instruction content, a sound provided together with the consecutive instruction content, and a tactile sensation provided together with the consecutive instruction content.

11. A control apparatus that presents a three-dimensional operation to a worker using cross reality, comprising:

a computer including a calculation device that performs a predetermined calculation process and a storage device that the calculation device is able to access, wherein the calculation device includes an acquisition unit that acquires work information of work performed by the worker, wherein the calculation device includes a calculation unit that performs calculation to present consecutive instruction content corresponding to the work performed by the worker to the worker, wherein the calculation device includes an output unit that outputs content, wherein the calculation unit includes a control unit that dynamically controls a display method for the consecutive instruction content according to a spatial divergence between the work information acquired by the acquisition unit and the consecutive instruction content, wherein the control unit adds additional information generated according to work information acquired by the acquisition unit to the consecutive instruction content, and wherein the calculation unit generates additional information for causing the consecutive instruction content to be viewable and adds the generated additional information to the consecutive instruction content when the worker is not viewing the consecutive instruction content.

12. An information presentation method in which a control apparatus presents a three-dimensional operation to a worker using cross reality, wherein the control apparatus is configured with a computer including a calculation device that performs a predetermined calculation process and a storage device that the calculation device is able to access, the information presentation method comprises:

an acquisition procedure of acquiring work information of work performed by the worker by the calculation device;

a calculation procedure of performing calculation to present consecutive instruction content corresponding to the work performed by the worker to the worker by the calculation device; and an output procedure of outputting content by the calculation device, wherein the calculation procedure includes a control procedure of dynamically controlling a display method for the consecutive instruction content according to a spatial divergence between the work information acquired in the acquisition procedure and the consecutive instruction content, wherein the control procedure changes a presentation speed of the consecutive instruction content according to a spatial divergence between the work information and the consecutive instruction content, and wherein the control procedure includes determining that the spatial divergence between the work information and the consecutive instruction content is large when a time at which a first feature point with a largest positional change within a predetermined time and a second feature point included in the consecutive instruction content corresponding to the first feature point have an identical space movement amount among feature points included in the work information is distant by a predetermined threshold or more.

* * * * *